United States Patent
Ulbricht et al.

(10) Patent No.: US 10,373,018 B2
(45) Date of Patent: Aug. 6, 2019

(54) METHOD OF DETERMINING A SIMILARITY TRANSFORMATION BETWEEN FIRST AND SECOND COORDINATES OF 3D FEATURES

(71) Applicant: Apple Inc., Cupertino, CA (US)

(72) Inventors: Daniel Ulbricht, Sunnyvale, CA (US); Thomas Olszamowski, Munich (DE)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 15/028,364

(22) PCT Filed: Oct. 8, 2013

(86) PCT No.: PCT/EP2013/070936
§ 371 (c)(1),
(2) Date: Apr. 8, 2016

(87) PCT Pub. No.: WO2015/051827
PCT Pub. Date: Apr. 16, 2015

(65) Prior Publication Data
US 2016/0259993 A1 Sep. 8, 2016

(51) Int. Cl.
*G06K 9/62* (2006.01)
*G06T 7/20* (2017.01)
(Continued)

(52) U.S. Cl.
CPC .............. *G06K 9/6215* (2013.01); *G06T 7/20* (2013.01); *G06T 7/33* (2017.01); *G06T 7/579* (2017.01);
(Continued)

(58) Field of Classification Search
CPC .................................................. G06K 9/6215
(Continued)

(56) References Cited

U.S. PATENT DOCUMENTS

| 2009/0243889 | A1* | 10/2009 | Suhr | G06K 9/00812 340/932.2 |
| 2010/0239121 | A1* | 9/2010 | Meier | G06T 7/0046 382/103 |
| 2011/0311104 | A1* | 12/2011 | Sinha | G06T 7/0042 382/106 |

FOREIGN PATENT DOCUMENTS

FR 2950138 A1 3/2011

OTHER PUBLICATIONS

Agarwal, Anubhav, C. V. Jawahar, and P. J. Narayanan. "A survey of planar homography estimation techniques." Centre for Visual Information Technology, Tech. Rep. IIIT/TR/2005/12 (2005).
(Continued)

*Primary Examiner* — Yulin Sun
(74) *Attorney, Agent, or Firm* — Blank Rome LLP

(57) ABSTRACT

The invention is related to a method of determining a similarity transformation between first coordinates and second coordinates of 3D features, comprising providing a first plurality of 3D features having first coordinates in a first coordinate system which is associated with a first geometrical model of a first real object, wherein the first plurality of 3D features describes physical 3D features of the first real object, providing a second coordinate system, providing image information associated with a plurality of images captured by at least one camera, for each respective 3D feature of at least part of the first plurality of 3D features, wherein the respective 3D feature is captured by at least two of the plurality of images, determining camera poses of the at least one camera in the second coordinate system while the at least two of the plurality of images are captured, determining for the respective 3D feature a second coordinate in the second coordinate system according to the at least two of the plurality of images and the camera poses, and the method further comprising determining a similarity trans-
(Continued)

formation between the first coordinates and the second coordinates of the at least part of the first plurality of 3D features, wherein the similarity transformation includes at least one translation, at least one rotation, at least one scale and/or their combinations in 3D space.

20 Claims, 4 Drawing Sheets

(51) Int. Cl.
    *G06T 7/33*     (2017.01)
    *G06T 7/579*     (2017.01)
    *G06T 19/20*     (2011.01)
    *H04N 5/247*     (2006.01)
    *G06T 7/70*     (2017.01)

(52) U.S. Cl.
    CPC ............ *G06T 7/70* (2017.01); *G06T 19/20* (2013.01); *H04N 5/247* (2013.01); *G06T 2200/04* (2013.01); *G06T 2207/10028* (2013.01); *G06T 2207/30244* (2013.01)

(58) Field of Classification Search
    USPC .......................................... 348/135
    See application file for complete search history.

(56) References Cited

OTHER PUBLICATIONS

Azuma, Ronald, et al., "Recent advances in augmented reality," Computer Graphics and Applications, IEEE 21.6 (2001): 34-47.

Castle, Robert, Georg Klein, and David W. Murray. "Video-rate localization in multiple maps for wearable augmented reality." Wearable Computers, 2008. ISWC 2008. 12th IEEE International Symposium on. IEEE, 2008.

Davison et al., "MonoSLAM: Real-time single camera SLAM." Pattern Analysis and Machine Intelligence, IEEE Transactions on 29.6 (2007): 1052-1067.

Hartley, R., et al., "Multiple View Geometry in computer vision," Second Edition, Cambridge University Press 2000, 2003, Chapters 9, 10 and 18; 75 pages.

Hyon Lim et al., "Real-time single camera SLAM using fiducial markers," ICCAS-SICE, 2009, IEEE, Piscataway, NJ, USA, Aug. 18, 2009 (Aug. 18, 2009), pp. 177-182, XP031566132, ISBN: 978-4-907764-34-0.

Klein, et al. "Parallel Tracking and Mapping for Small AR Workspaces," 2007 IEEE/ACM International Symposium on Mixed and Augmented Reality, pp. 225-234, 2007.

Lemaire, Thomas, et al. "Vision-based slam: Stereo and monocular approaches." International Journal of Computer Vision 74.3 (2007): 343-364.

Lieberknecht, Sebastian, et al. "RGB-D camera-based parallel tracking and meshing." Mixed and Augmented Reality (ISMAR), 2011 10th IEEE International Symposium on. IEEE, 2011.

Malis, Ezio, and Manuel Vargas. "Deeper understanding of the homography decomposition for vision-based control" (2007). APA.

Nutzi, Gabriel, et al. "Fusion of IMU and vision for absolute scale estimation in monocular SLAM." Journal of intelligent & robotic systems 61.1-4 (2011): 287-299.

Petersen, "A Comparison of 2D-3D Pose Estimation Methods," Master's thesis, Aalborg University-Institute for Media Technology Computer Vision and Graphics, Lautrupvang 15: 2750.

Pinies P et al., "Inertial Aiding of Inverse Depth SLAM using a Monocular Camera," 2007 IEEE International Conference on Robotics and Automation—Apr. 10-14, 2007—Roma, Italy, IEEE, Piscataway, NJ, USA, Apr. 10, 2007 (Apr. 10, 2007), pp. 2797-2802, XP031389220, ISBN: 978-1-4244-0601-2.

Pustka, Daniel, et al. "Spatial relationship patterns: Elements of reusable tracking and calibration systems." ISMAR 2006.

Rainer Mautz et al., "Survey of optical indoor positioning systems," Indoor Positioning and Indoor Navigation (IPIN), 2011 International Conference on, IEEE, Sep. 21, 2011 (Sep. 21, 2011), pp. 1-7, XP031990140, DOI: 10.1109/IPIN.2011.6071925, ISBN: 978-1-4577-1805-2.

Strasdat, Hauke, J. M. M. Montiel, and Andrew J. Davison. "Scale drift-aware large scale monocular SLAM." Proceedings of Robotics: Science and Systems (RSS). vol. 2. No. 3. 2010.

Umeyama, "Least-Squares Estimation of Transformation Parameters Between Two Point Patterns," IEEE Trans. Pattern Anal. Mach. Intell. 13, 4, pp. 376-380, 1991.

\* cited by examiner

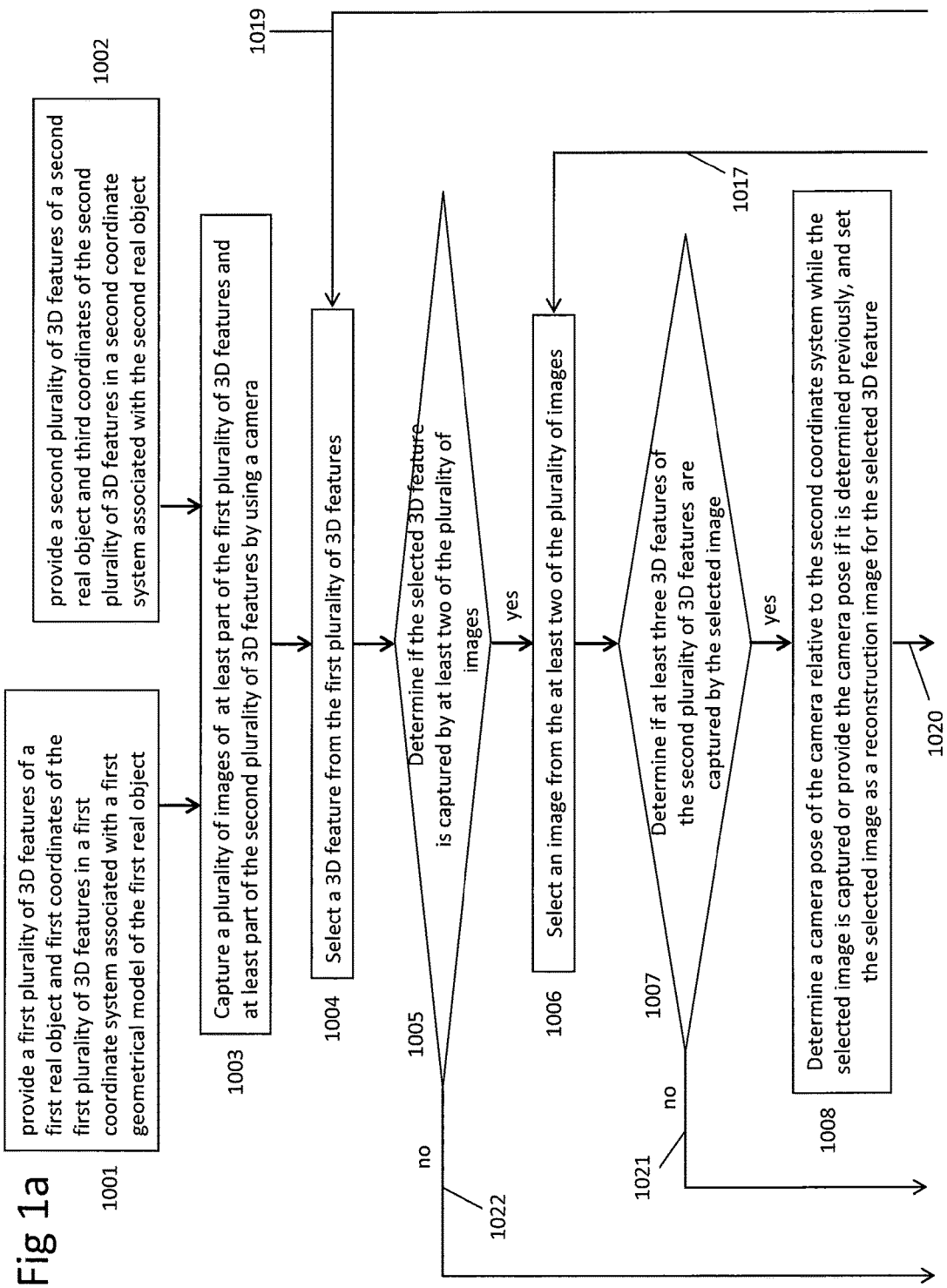

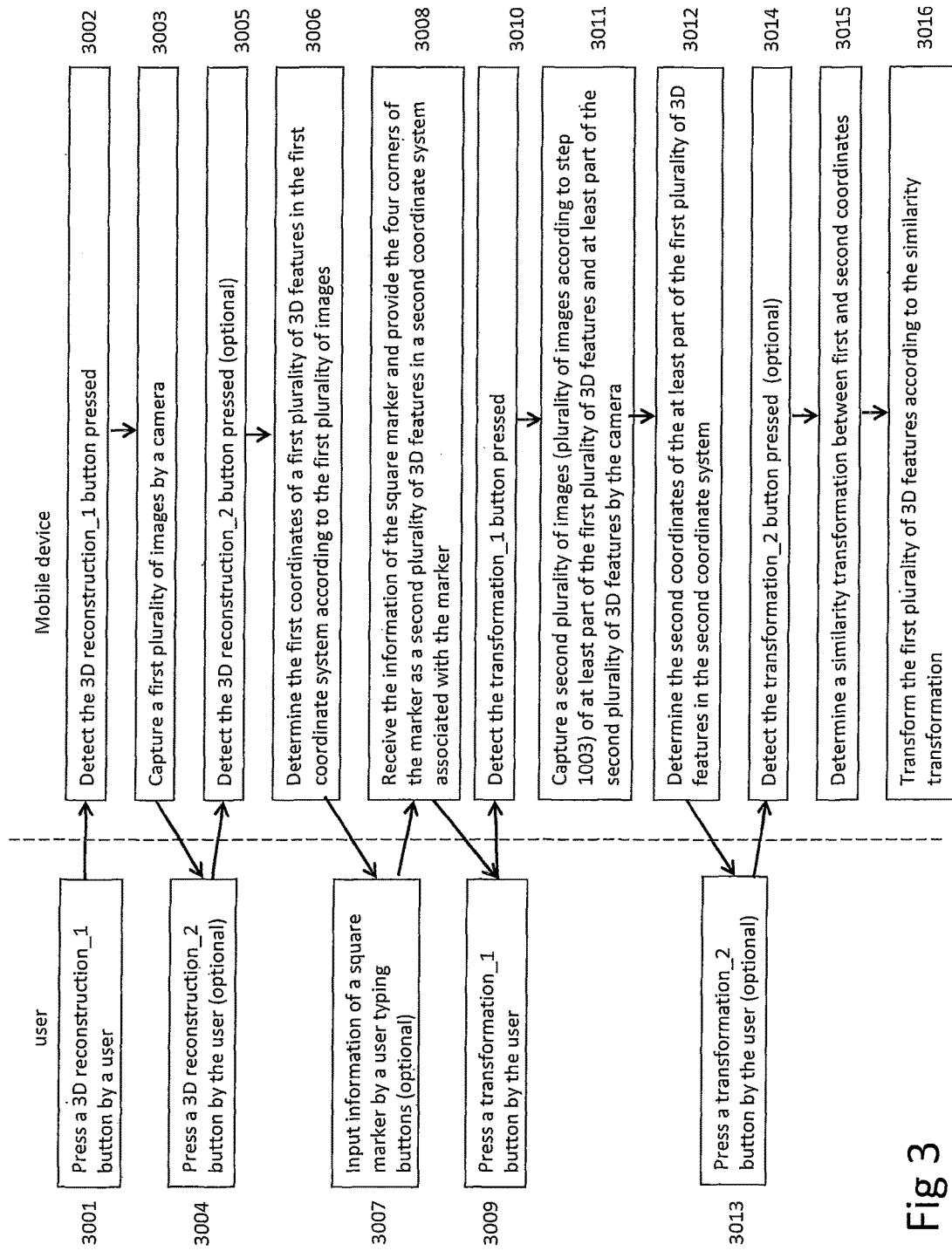

METHOD OF DETERMINING A SIMILARITY TRANSFORMATION BETWEEN FIRST AND SECOND COORDINATES OF 3D FEATURES

BACKGROUND

The present invention is related to a method of determining a similarity transformation between first and second coordinates of 3D features, which comprises providing a first plurality of 3D features having first coordinates in a first coordinate system which is associated with a first geometrical model of a first real object, with the first plurality of 3D features describing physical 3D features of the first real object, providing a second coordinate system, and providing image information associated with a plurality of images captured by at least one camera.

Such method may be used, for example, in relation with Vision based Simultaneous Localization and Mapping (SLAM), such as disclosed in Davison, Andrew J., et al., "MonoSLAM: Real-time single camera SLAM," Pattern Analysis and Machine Intelligence, IEEE Transactions on 29.6 (2007): 1052-1067, which is a well-known technology for creating a geometrical model of a real environment using one or more cameras without requiring any pre-knowledge of the environment. The geometrical model that has at least depth information is also referred to as a 3D map of the real environment. The creation of the geometrical model of the environment is also called the reconstruction of the real environment. The created (or typically called reconstructed) geometrical model could be represented by a plurality of 3D features, such as point features and edge features. The 3D features describe physical 3D features of the real environment. A real environment may also be called a real object, or may be understood to comprise one or more real objects.

The geometrical model (or 3D map) of the real environment can be created using triangulation of 2D observations shared in a plurality of images captured by one or more cameras. The triangulation is a common method used in 3D reconstruction based on camera images, see Hartley, Richard, and Andrew Zisserman, "Multiple view geometry in computer vision," Vol. 2, Cambridge, 2000.

A pose of a camera describes a spatial relationship or a rigid transformation between the camera at a particular position and a reference coordinate system. The reference coordinate system may be associated with a real object or with the camera at another position. The spatial relationship or the rigid transformation describes at least one translation, or at least one rotation, or their combination in 3D space.

The reconstructed geometrical model can be used for determining a pose (i.e. position and/or orientation) of a camera. By matching extracted 2D features of a current camera image with 3D features existing in the geometrical model a plurality of 2D-3D correspondences can be established. Then, the camera position and orientation in a coordinate system of the geometrical model can be computed based on the correspondences. Camera pose estimation is also known as tracking a camera.

Vision based SLAM facilitates many applications, such as vision based navigation of a robot system or a vehicle. Particularly, it is a promising technology that could support Augmented Reality (AR) systems or applications (see Azuma, Ronald, et al., "Recent advances in augmented reality," Computer Graphics and Applications, IEEE 21.6 (2001): 34-47) in an unknown real environment.

A common problem of various SLAM systems is that a reconstructed geometrical model of a real environment is up to a scale as an undetermined factor. In this case, the SLAM systems may assign a random scale. Therefore, reconstructed 3D features have scaled coordinates in a coordinate system associated with the geometrical model compared to true coordinates as they are in the real world. Further, camera positions computed based on the recovered scaled geometrical models are also up to the scale, see Strasdat, Hauke, J. M. M. Montiel, and Andrew J. Davison," Scale drift-aware large scale monocular SLAM," Proceedings of Robotics: Science and Systems (RSS), Vol. 2, No. 3, 2010.

The undetermined scale factor introduces challenges to determine true camera movements in, for example, vision based navigation of a robot system or a vehicle, and to correctly overlay virtual visual information to the real environment in an image of a camera in AR applications.

Particularly, in a situation in which multiple geometrical models of multiple real objects are created using the same vision based SLAM system for tracking the multiple real objects simultaneously, like in Castle, Robert, Georg Klein, and David W. Murray, "Video-rate localization in multiple maps for wearable augmented reality," Wearable Computers, 2008, ISWC 2008, 12 IEEE International Symposium on, IEEE, 2008, the problem of undetermined scale factors is quite significant. Typically, random scale values are applied to each of the multiple geometrical models. If the SLAM system switches between the geometrical models, the scale may change and, therefore, the user experience in computer vision applications like Augmented Reality is seriously affected.

A correct scale factor may be applied in defining true sizes of geometrical models of real environments or real objects and true camera poses as they are in the real world.

Various methods have been proposed for determining correct scale factors that could define true sizes of reconstructed geometrical models of real environments as they are in the real world.

For example, Davison et al. in Davison, Andrew J., et al., "MonoSLAM: Real-time single camera SLAM," Pattern Analysis and Machine Intelligence, IEEE Transactions on 29.6 (2007): 1052-1067, propose to introduce calibration objects with known geometrical dimension for determining correct scale factors for SLAM systems.

Lemaire at al. in Lemaire, Thomas, et al., "Vision-based slam: Stereo and monocular approaches," International Journal of Computer Vision 74.3 (2007): 343-364 propose to use a stereo camera system to solve the problem of determining scale factors in SLAM systems. However, using a stereo camera is only a partial remedy, since the displacement between the two cameras has to be significant in relation to the distance to the environment in order to reliably compute depth of the environment.

Lieberknecht et al. in Lieberknecht, Sebastian, et al., "RGB-D camera-based parallel tracking and meshing," Mixed and Augmented Reality (ISMAR), 2011 10$^{th}$ IEEE International Symposium on, IEEE, 2011, integrate depth information into monocular vision based SLAM to allow correctly scaled geometrical model reconstruction by employing a RGB-D camera that provides depth information related to image pixels. It is possible to determine a scale factor from known depth information. However, a RGB-D camera device is not commonly available in a hand-held device, e.g. mobile phone, PDA, compared to a normal RGB camera.

Klein et al. in Klein, Georg, and David Murray, "Parallel tracking and mapping for small AR work-spaces," Mixed and Augmented Reality, 2007, ISMAR 2007, 6$^{th}$ IEEE and ACM International Symposium on, IEEE, 2007, solve the problem of scale estimation by manually defining a baseline between a camera capturing two images needed for 3D triangulation.

Sensor fusion with an Inertial Measurement Unit (IMU) could also be used to estimate the scale, as disclosed in Mitzi, Gabriel, et al. "Fusion of IMU and vision for absolute scale estimation in monocular SLAM." Journal of intelligent & robotic systems 61.1-4 (2011): 287-299. One problem with this approach is the inaccuracy of the sensor values and therefore expensive (i.e. calculation intensive) techniques like "Kalman Filtering" or "Bundle Adjustment" are needed to solve the problem.

SUMMARY

It is an object of the invention to determine a correct scale for a reconstructed geometrical model of a real environment such that the geometrical model can be scaled to a true size as it is in the real world.

According to an aspect of the invention, there is disclosed a method of determining a similarity transformation between first coordinates and second coordinates of 3D features, comprising providing a first plurality of 3D features having first coordinates in a first coordinate system which is associated with a first geometrical model of a first real object, wherein the first plurality of 3D features describes physical 3D features of the first real object, providing a second coordinate system, and providing image information associated with a plurality of images captured by at least one camera. For each respective 3D feature of at least part of the first plurality of 3D features, wherein the respective 3D feature is captured by at least two of the plurality of images, camera poses of the at least one camera in the second coordinate system while the at least two of the plurality of images are captured are determined, and for the respective 3D feature a second coordinate in the second coordinate system is determined according to the at least two of the plurality of images and the camera poses. The method further comprises determining a similarity transformation between the first coordinates and the second coordinates of the at least part of the first plurality of 3D features, wherein the similarity transformation includes at least one translation, at least one rotation, at least one scale and/or their combinations in 3D space.

Thus, at least one scale factor may be determined that could be used to scale a plurality of 3D features defined in a coordinate system associated with a geometrical model describing a real object by computing coordinates of at least part of the plurality of 3D features in another coordinate system using, e.g., vision based triangulation.

According to an embodiment, the method further includes transforming the first coordinates of the first plurality of 3D features according to the similarity transformation.

According to a further embodiment, the at least part of the first plurality of 3D features contains at least three 3D features.

According to an embodiment, the second coordinates of the at least part of the first plurality of 3D features are determined based on triangulation according to image positions of the respective 3D feature in the at least two of the plurality of images.

In an embodiment, the method further includes providing a second plurality of 3D features having third coordinates in a third coordinate system, wherein the third coordinate system is associated with a second real object or with a second geometrical model of the second real object, and the second plurality of 3D features describes physical 3D features of the second real object, and for the respective 3D feature of the at least part of the first plurality of 3D features, at least part of the second plurality of 3D features is captured in each of the at least two of the plurality of images.

For example, the second coordinate system and the third coordinate system are the same, and the camera poses of the at least one camera in the second coordinate system are determined according to image positions of the at least part of the second plurality of 3D features in the at least two of the plurality of images and corresponding third coordinates.

According to another embodiment, the second coordinate system is associated with the at least one camera at a position in which one of the plurality of images is captured, and the camera poses of the at least one camera in the second coordinate system are determined according to camera poses of the at least one camera determined in the third coordinate system.

According to an embodiment, the method further comprises providing a tracking system, wherein for the respective 3D feature of the at least part of the first plurality of 3D features, the camera poses of the at least one camera in the second coordinate system according to the tracking system are determined, wherein the second coordinate system is associated with the tracking system or associated with the at least one camera at a position when one of the plurality of images is captured.

According to an embodiment, the at least one camera is at least one second camera and the plurality of images is a second plurality of images, wherein the method further comprises providing image information associated with a first plurality of images of at least part of the first real object captured by at least one first camera, and determining the first coordinates of the first plurality of 3D features in the first coordinate system according to the first plurality of images. The at least one first camera and the at least one second camera may be the same or different cameras.

According to an embodiment, the method may further comprise detecting a first user input, and if the detected first user input is associated with a 3D reconstruction operation, performing the 3D reconstruction operation associated with the detected first user input, wherein the 3D reconstruction operation comprises executing at least part of the steps as described in the paragraph above. Further, the method may comprise detecting a second user input, and if the detected second user input is associated with a transform operation, performing the transform operation associated with the detected second user input, wherein the transform operation comprises executing at least part of the steps as described herein before.

According to an embodiment, the method further comprises detecting a third user input, and if the detected third user input is associated with a tracking configuration operation, performing the tracking configuration operation associated with the detected third user input, wherein the tracking configuration operation comprises specifying a tracking configuration for determining the camera poses of the at least one camera in the second coordinate system.

According to an embodiment, the first plurality of features comprises point features and the second plurality of features comprises point features.

For example, the first user input, the second user input and/or the third user input includes at least one user interaction. The user interaction may be pressing a button, touching a screen, speech recognition and/or gesture recognition.

According to another aspect, the invention is related to a computer program product comprising software code sections which are adapted to perform a method according to the invention when loaded into internal memory of one or more processing devices. Particularly, the computer program product is contained on a computer readable medium and is non-transitory. The software code sections may be loaded into a memory of one or more processing devices, such as contained in a mobile device, like a mobile phone or tablet computer, or in a computer device, like a personal computer or server computer.

A real object may be any object that has a physical geometric shape in the real world. The real object could further include one or more real objects. For example, the real object may be an interior of a room or a vehicle. The real object could also be, for example, a chair, a building, a mountain, a tree or a table. An interior of a room (as a real object) may further include a chair and/or a table. A real object is also referred to herein as real environment. The real object can also be an arrangement of a plurality of real objects. For example, an indoor object may be an arrangement of a chair, a table, and a sofa.

The first plurality of 3D features represents or describes physical 3D features of the first real object or at least part of the first real object. The first plurality of 3D features are, for example, but not limited to, points, edges, lines, segments, corners and/or any other geometrical shapes.

The first geometrical model describes the first real object or a part of the first real object. At least part of the first geometrical model comprises at least part of the first plurality of 3D features. The first coordinate system is associated with the first geometrical model. The first geometrical model may be up to a scale compared to a true size of the first real object as it is in the real world.

The first coordinates of the first plurality of 3D features in the first coordinate system may be obtained from the first geometrical model. The first coordinates and sizes of the first plurality of 3D features in the first coordinate system may also be up to a scale compared to true coordinates and sizes of the corresponding physical 3D features of the first real object in a coordinate system of the first real object as they are in the real world. The scale may be the same or may be different in one, two, or all three directions in 3D space.

The first plurality of 3D features and the related first coordinates may be generated by using a vision based SLAM method. For example, —another plurality of images of at least part of the first real object may be captured by one or more cameras. At least part of the one or more cameras may be the same as or different from the at least one camera. 3D features of the first real object may be detected in the another plurality of images. Then, correspondences between image projections of 3D features in the another plurality of images may be determined. The first plurality of 3D features and the related first coordinates could be determined according to the image projection correspondences. Camera poses of the one or more cameras relative to the first real object when the another plurality of images are captured may also be determined based on the correspondences. The determined camera poses may be up to a scale compared to true camera poses as they are in the real world. The first coordinates determined in this way may also be up to a scale compared to true coordinates as they are in the real world.

The first plurality of 3D features may also be created in a 3D animation software, e.g. a CAD program. A real object might be printed by using a 3D printer according to the first plurality of 3D features.

The plurality of images may be captured by one camera or multiple cameras. Each of the plurality of images captures at least part of the first plurality of 3D features. For example, the respective image may capture at least part of the first real object that contains corresponding physical 3D features.

A camera is an image capturing device to capture imagery information of real objects. Intrinsic camera parameters of the at least one camera may be provided or calibrated. The present invention can be applied with receiving image information from any camera providing images of real objects. It is not restricted to cameras providing color images in the RGB format. It can also be applied to any other color format and also to monochrome images, for example to cameras providing images in grayscale format. The camera may further provide an image with depth data. The depth data does not need to be provided in the same resolution as the (color/grayscale) image. A camera providing an image with depth data is often called RGB-D camera. A RGB-D camera system could be a time of flight (TOF) camera system. The at least one camera could also capture light that is invisible to human eyes. For example, the at least one camera may be an infrared camera capturing infrared lights.

The second coordinate system may be associated with a second real object or with a second geometrical model of the second real object. The second coordinate system may be different from or the same as the first coordinate system. Further, the first real object and the second real object may be the same, or different, or have at least one common part.

The second coordinate system may also be associated with the at least one camera at a particular position. The second coordinate system may be defined as the same as a coordinate system associated with the at least one camera at a position when one of the plurality of images is captured. For example, the origin of the second coordinate system could be at the optical center of the at least one camera capturing the one of the plurality of images.

Further, based on a camera pose of the at least one camera relative to the second real object, coordinates or similarity transformations defined in a coordinate system associated with the second real object can be transformed to a coordinate system associated with the at least one camera, and vice versa.

According to an embodiment, the at least part of the first plurality of 3D features contains at least three 3D features. Each respective 3D feature of the at least part of the first plurality of 3D features is captured by at least two of the plurality of images.

In one embodiment for determining the camera poses of the at least one camera relative to the second coordinate system, a second plurality of 3D features is provided. Third coordinates of the second plurality of 3D features in a third coordinate system associated with the second real object or a second geometrical model of the second real object may also be provided. The second plurality of 3D features represents or describes physical 3D features of the second real object or at least part of the second real object. The second plurality of 3D features are for example, but not limited to, points, edges, lines, segments, corners and/or any other geometrical shapes.

In one example, the second coordinate system may be the same as the third coordinate system. Then, the third coordinates are also valid in the second coordinate system for the second plurality of 3D features.

For each respective 3D feature of the at least part of the first plurality of 3D features, the camera poses of the at least one camera relative to the second coordinate system when the at least two of the plurality of images are captured can be determined according to at least part of the second plurality of 3D features. For this, each of the at least two of the plurality of images may capture at least three 3D features of the second plurality of 3D features. For example, the respective image may capture at least part of the second real object that contains corresponding physical 3D features.

The camera poses relative to the third coordinate system may be determined according to image positions of the at least three 3D features of the second plurality of 3D features in the at least two of the plurality of images and corresponding third coordinates of the at least three 3D features. Several 2D-3D correspondences based on pose estimation methods can be used to compute the camera poses, see in this regard Petersen, Thomas. "A Comparison of 2D-3D Pose Estimation Methods." Master's thesis, Aalborg University-Institute for Media Technology Computer Vision and Graphics, Lautrupvang 15: 2750. If the second coordinate system is the same as the third coordinate system, the camera poses are also defined in the second coordinate system.

In another example, the second coordinate system may be associated with the at least one camera at any position (called as reference camera position). For example, the second coordinate system may be associated with the at least one camera at a position where one of the plurality of images is captured. In this case, a camera pose of the at least one camera in the second coordinate system when each of the plurality of images is captured describes a rigid transformation (translation and/or rotation) between the reference camera position of the at least one camera and a position of the at least one camera when capturing the each of the plurality of images.

A pose of the at least one camera at the reference camera position in the third coordinate system can be computed using the same method mentioned above. Then, the camera poses of the at least one camera relative to the reference camera position (i.e. the second coordinate system) while the at least two of the plurality of images are captured may be computed according to the corresponding camera poses determined in the third coordinate system.

A rigid transformation between the at least one camera at two positions capturing two of the plurality of images may also be determined based on a planar homography between image positions of 3D features of the second plurality of 3D features captured in the two images. This requires that the two images capture the same 3D features.

A planar homography exists between the two images between image projections of 3D features on a 3D plane. When the 3D features of the second plurality of 3D features are located on the same plane in 3D space, a planar homography between the two of the plurality of images can be estimated. When the 3D features are point features, the planar homography may be estimated based on at least four point features using techniques proposed in Agarwal, Anubhav, C. V. Jawahar, and P. J. Narayanan. "A survey of planar homography estimation techniques." Centre for Visual Information Technology, Tech. Rep. IIIT/TR/2005/12 (2005). Other geometric 3D features, such as lines or conics, projected in the two of the plurality of images can also be used to determine the planar homography according to Agarwal, Anubhav, C. V. Jawahar, and P. J. Narayanan. "A survey of planar homography estimation techniques." Centre for Visual Information Technology, Tech. Rep. IIIT/TR/ 2005/12 (2005). Particularly, the planar homography may also be estimated based on at least two conics features using techniques proposed in Agarwal, Anubhav, C. V. Jawahar, and P. J. Narayanan. "A survey of planar homography estimation techniques." Centre for Visual Information Technology, Tech. Rep. IIIT/TR/2005/12 (2005). Then, a vision method based planar homography decomposition, such as in Malis, Ezio, and Manuel Vargas. "Deeper understanding of the homography decomposition for vision-based control." (2007). APA, can be applied to determine the rigid transformation between the at least one camera at the two positions according to the one planar homography. This may further require third coordinates of the 3D features of the second plurality of 3D features to define a position of the plane where the 3D features are located.

In another embodiment for determining the camera poses of the at least one camera relative to the second coordinate system, a tracking system is provided and the second coordinate system may be associated with the tracking system. Particularly, the tracking system may be a mechanical arm, and the at least one camera may be mounted to the mechanical arm, like a system proposed in US Patent Publication No. 2010/0239121 A1. The second coordinate system may also be associated with the at least one camera at a position when one of the plurality of images is captured.

The tracking system may also be an optical tracking system, and the at least one camera may be tracked by the optical tracking system according to fiducial markers mounted to the at least one camera, like a system disclosed in Pustka, Daniel, et al. "Spatial relationship patterns: Elements of reusable tracking and calibration systems." ISMAR 2006.

With using a tracking system, the camera poses of the at least one camera relative to the second coordinate system can be determined according to the tracking system.

For the respective 3D feature, at least part of the camera poses of the at least one camera while the at least two of the plurality of images are captured may be determined previously. For example, another 3D feature of the first plurality of 3D features may also be captured in the at least two of the plurality of images, the camera poses might already be determined for the another 3D feature. When this is the case, it is not necessary to determine corresponding camera poses again.

The second coordinate of the respective 3D feature in the second coordinate system can be determined according to the 2D image positions of the 3D feature in the at least two of the plurality of images and the camera poses of the at least one camera relative to the second coordinate system while the at least two of the plurality of images are captured.

Correspondences between 2D image positions of the 3D feature in the at least two of the plurality of images may be determined. Then, a triangulation method, such as in Hartley, Richard, and Andrew Zisserman. Multiple view geometry in computer vision. Vol. 2. Cambridge, 2000, can be used to determine the second coordinate of the 3D feature from the image correspondences.

The method may further comprise the following steps:

The similarity transformation can be determined based on the first coordinates and the second coordinates of the at least part of the first plurality of 3D features according to a method as disclosed in, e.g., Umeyama, Shinji. "Least-squares estimation of transformation parameters between two point patterns." Pattern Analysis and Machine Intelligence, IEEE Transactions on 13.4 (1991): 376-380. The similarity transformation may include at least one translation, at least one rotation, at least one scale or their combinations in 3D space. The at least one scale may be derived from the similarity transformation.

The first coordinates of the first plurality of 3D features in the first coordinate system may be further transformed by the similarity transformation or scaled by the at least one scale. For example, the first coordinates of the first plurality of 3D features defined in the first coordinate system may be transformed to the second coordinate system by the similarity transformation.

Moreover, the invention is concerned with a computer implemented user interaction method, as described herein, for a user to interact with the present invention. A user interaction could be one of speaking, running, jumping, blinking, and/or moving any parts of the user. A user interaction may also be pressing a button, touching a screen, speaking into a microphone, gazing or gesturing. The user interaction may also be placing a real object into a field of view of a camera such that the real object is recognized based on an image of at least part of the real object captured by the camera.

A tracking configuration is related to determining camera poses in the second coordinate system. For example, the tracking configuration may specify using the tracking system or using the second plurality of 3D features to determine the camera poses of the at least one camera in the second coordinate system. When using the second plurality of 3D features, the tracking configuration may specify an appearance or a physical size of the second real object containing the second plurality of 3D features. For example, the second real object may be a visual square marker, and the tracking configuration could specify an appearance of the marker to identify the marker based on camera images. The tracking configuration may also indirectly set the third coordinates of the second plurality of 3D features by specifying a physical size of the marker.

The tracking configuration may be previously specified. The tracking configuration may also be specified according to a user input. The computer implemented user interaction method may instruct the user to place a pre-defined object, such as a visual square marker, into a field of view of the at least one camera. Placing the marker into the field of view of the at least one camera may let the tracking configuration be specified according to analyzing an image of the marker captured by the at least one camera.

BRIEF DESCRIPTION OF DRAWINGS

Aspects and embodiments of the invention will now be described with respect to the drawings, in which:

FIG. 1a shows a flowchart of an exemplary embodiment of the present invention,

FIG. 3 shows a flowchart of an exemplary embodiment of potential user interactions based on the present invention.

DETAILED DESCRIPTION

Figure 1B:
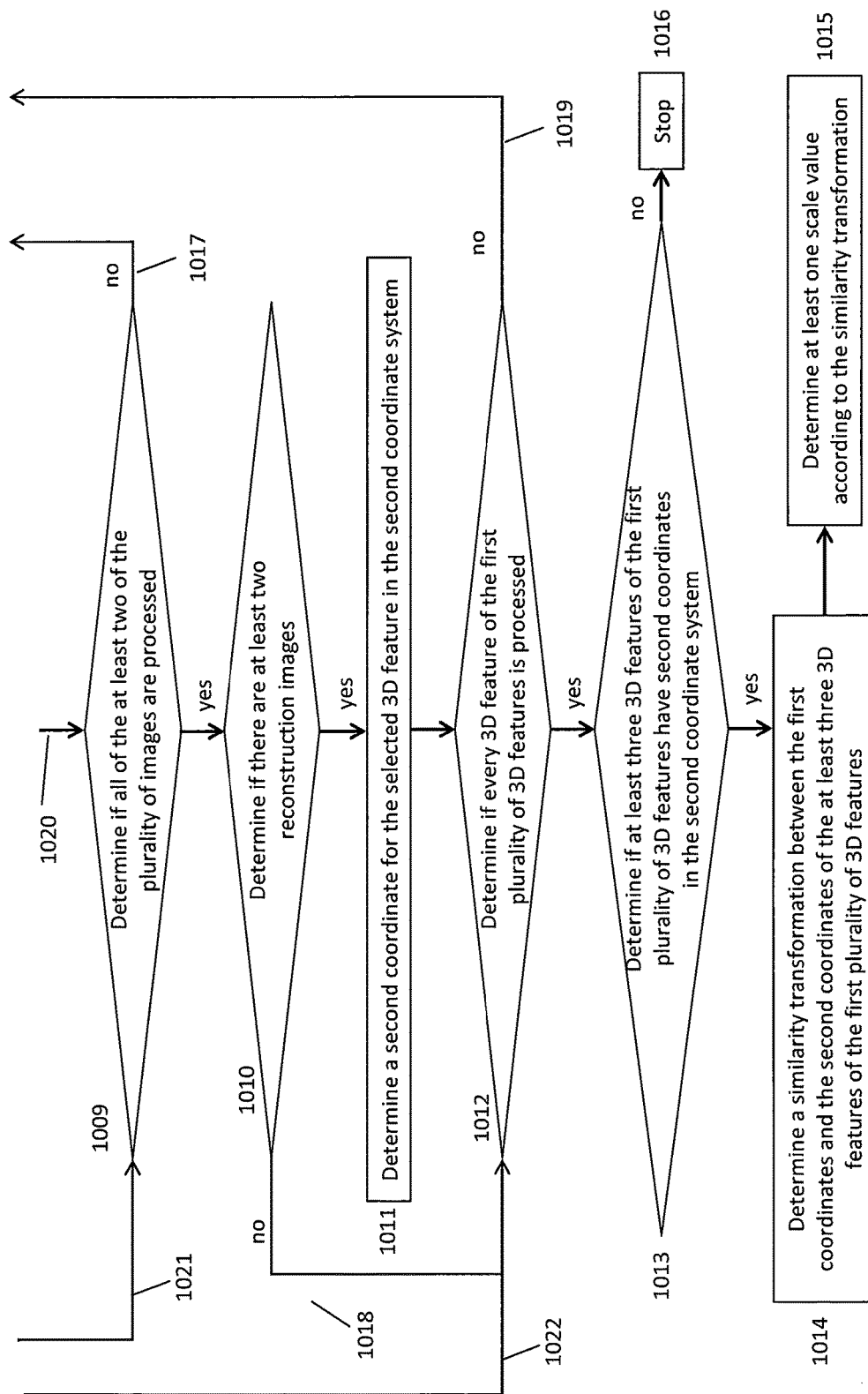
FIG. 1b shows a flowchart of an exemplary embodiment of the present invention.
Figure 2:
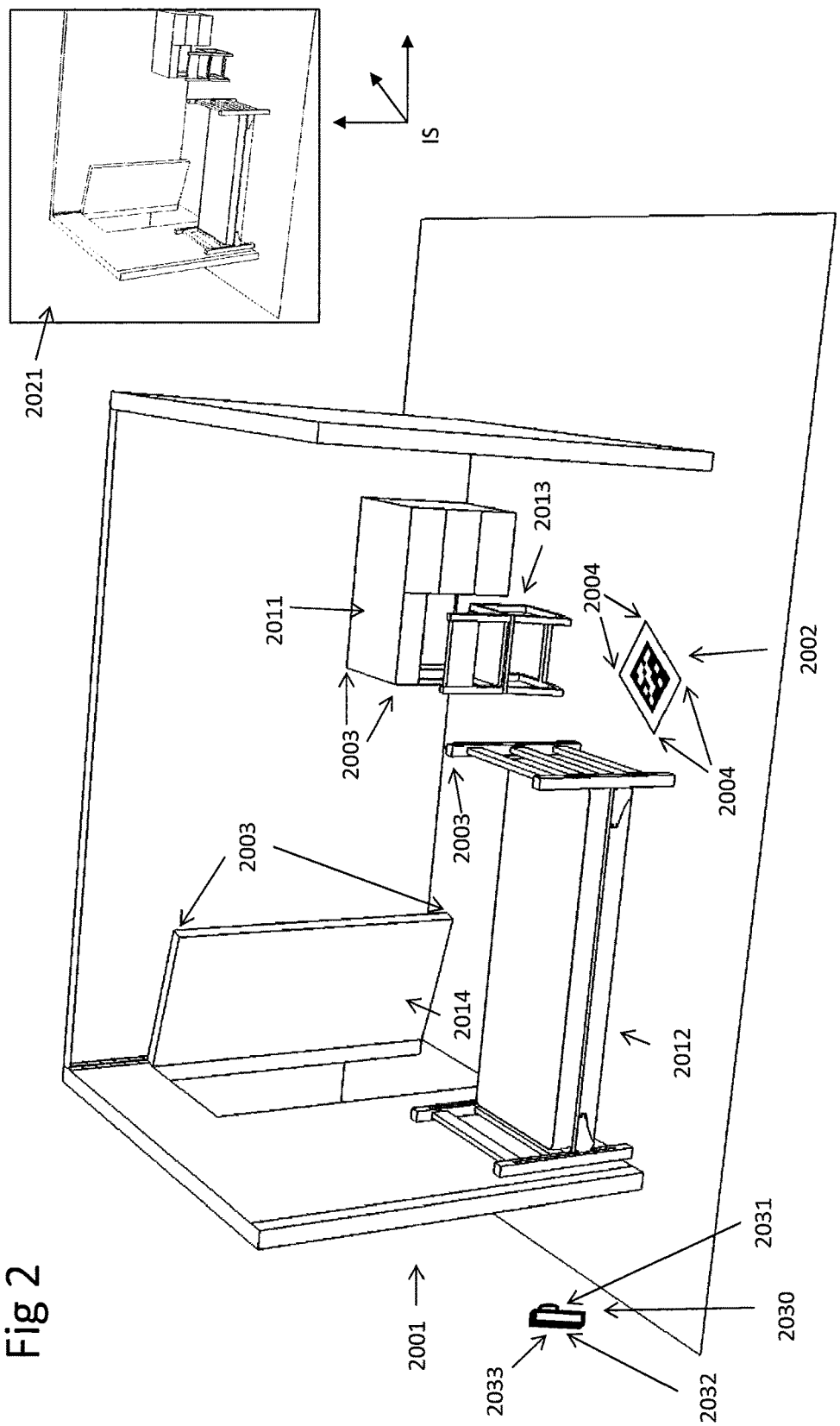
FIG. 2 shows an exemplary scene of the present invention.

In the following, aspects and embodiments of the invention will be described with reference to the exemplary embodiments as shown in FIGS. 1 to 3. Some of the following embodiments, such as shown in FIG. 3, are described with reference to using a mobile device, such as a mobile phone, but the invention may be applied in principle with any processing device, such as implemented in computer devices comprising one or more microprocessors for performing the respective steps. The steps as described herein may also be performed by a network of processing devices, such as a network of computers or a mobile device communicated with a server computer. FIG. 1 may refer to the combination of FIG. 1a-1b.

Referring now to FIGS. 1a-1b in connection with FIG. 2, step 1001 provides a first plurality of 3D features of a first real object and first coordinates of the first plurality of 3D features in a first coordinate system associated with a first geometrical model of the first real object. For example, the first real object is an indoor environment 2001 that includes a table 2011, a chair 2013, a bed 2012, and a door 2014 (see FIG. 2). The first plurality of 3D features, in this example, represents physical 3D features 2003 existing in the indoor environment 2001. A possible geometrical model is the geometrical model 2021 of a part of the indoor environment 2001. The model 2021 is up to a scale compared to the true size of the indoor environment 2001. A first coordinate system IS is associated with the model 2021. The model 2021 comprises at least part of the first plurality of 3D features. The first coordinates of the first plurality of 3D features defined in the first coordinate system of the model 2021 is also up to a scale.

As shown in FIG. 2, a mobile device 2030 contains a camera 2031 used to capture images. The mobile device further has a processing device 2032 that can be used to perform any of the steps according to the invention as described herein. The mobile device also includes a touch-screen 2033 that can display a graphical user interface such that a user can touch or press physical or displayed buttons of the graphical user interface.

Referring again to FIG. 1, step 1002 provides a second plurality of 3D features of a second real object and third coordinates of the second plurality of 3D features in a second coordinate system associated with the second real object. The second real object may be the square marker 2002 as shown in FIG. 2. The second plurality of 3D features may represent the four corners 2004 of the square marker 2002.

The camera 2031 of the mobile device 2030 (see FIG. 2) is used to capture at least part of the first plurality of 3D features and at least part of the second plurality of 3D features in a plurality of images in step 1003. The first plurality of images contains at least two images. In step 1004, a 3D feature is selected from the first plurality of 3D features. In step 1005, it is determined if the selected 3D feature is captured by at least two of the plurality of images. If not, then go to step 1012, otherwise, an image is selected from the at least two of the plurality of images in step 1006.

Step 1007 determines if at least three 3D features of the second plurality of 3D features are captured by the selected image. If not, then go to step 1009, otherwise go to step 1008 and determine a camera pose of the camera relative to the second coordinate system while the selected images is captured according to image positions of the at least three 3D features of the second plurality of 3D features and corresponding third coordinates of the at least three 3D features. In step 1008, the camera pose might be determined for one of previous selected 3D features of the first plurality of 3D features. For example, the camera pose when capturing the selected image might be determined for a previous selected 3D feature if the selected image captures the previous selected 3D feature, and in this case the camera pose can be directly provided. Step 1008 also sets the selected image as a reconstruction image for the selected 3D feature. If all of the at least two of the plurality of images are processed (step 1009), go to step 1010, otherwise go to step 1006 and select another image from the at least two of the plurality of images. Step 1010 determines if there are at least two reconstruction images for the selected 3D feature. If not, go to step 1012, otherwise, go to step 1011.

Step 1011 determines a second coordinate for the selected 3D feature in the second coordinate system. The second coordinate is computed based on a triangulation method using image positions of the 3D feature in the at least two reconstruction images and the corresponding camera poses relative to the second coordinate system. If not every 3D feature of the first plurality of 3D features is processed (determined in step 1012), then go to step 1003 and select another 3D feature from the first plurality of 3D features, otherwise go to step 1013.

Step 1013 determines if at least three 3D features of the first plurality of 3D features have determined second coordinates in the second coordinate system. If not, then stop, otherwise, go to step 1014.

Step 1014 determines a similarity transformation between the first coordinates and the second coordinates of the at least three 3D features of the first plurality of 3D features based on a method as described in Umeyama, Shinji. "Least-squares estimation of transformation parameters between two point patterns." Pattern Analysis and Machine Intelligence, IEEE Transactions on 13.4 (1991): 376-380. Step 1014 determines the at least one scale value according to the similarity transformation.

FIG. 3 shows a flowchart of an exemplary embodiment of potential user interactions based on the present invention, particularly a potential workflow for a user who may interact with the mobile device 2030 to determine a similarity transformation.

The steps 3006 to 3016 on the right side of FIG. 3 refer, at least in part, to the corresponding steps and routines as shown in FIG. 1 and already described above. The steps 3001 to 3013 shown on the left side of FIG. 3 are examples of potential user interactions in connection with the present invention. For instance, a "3D reconstruction button" may be a respective field displayed on the touchscreen 2033 of the mobile device, wherein upon touching or pressing this field (i.e. the 3D reconstruction_1 button or 3D reconstruction_2 button), the respective actions as shown on the right side of FIG. 3 are initiated or performed. In this example, the respective actions are related to a reconstruction of a respective real object. In this example, the first coordinates provided according to step 1001 in FIG. 1 are determined according to a first plurality of images captured in step 3003, which is not necessary if the first coordinates are already known. The second plurality of images according to step 3011, in this case, then corresponds to the plurality of images according to step 1003 in FIG. 1, which is then the basis for the process according to FIG. 1.

The 3D reconstruction buttons may also be given different names. This applies analogously also for the transformation_1 button and transformation_2 button related to the transformation process as described above. In general, these buttons are examples of respective user input receiving means for initiating one or more steps of the method according to the invention by user interaction. The input information according to step 3007 is exemplified for a square marker, but can generally be any input information related to a real object and/or for defining such real object.

Steps 3001, 3004, 3007, 3009, and 3013 are user interactions and the rest of the steps in FIG. 3 are performed on a processing device, here the mobile device. User interactions 3001 and 3004 may be included in a first user input. User interactions 3009 and 3013 may be included in a second user input. User interaction 3007 may be included in a third user input. A 3D reconstruction operation associated with the first user input may comprise steps 3002 to 3006. A transformation operation associated with the second user input may comprise steps 3011, 3012, 3015 and 3016. A tracking configuration operation associated with the third user input may comprise step 3008.

Optional steps 3004 and 3005 may be skipped. The 3D reconstruction_2 button may not be necessary to be pressed in order to trigger step 3006. Step 3006 may be directly performed as soon as step 3003 completes. Optional step 3007 may also be skipped. The information of the square marker may already be stored on the mobile device 2030 and can be provided without further user input. The information of the square marker could be an appearance of the maker for identifying the marker based on an image of the marker or a physical size of the marker. Step 3012 is performed according to the present invention, particularly according to the exemplary implementation shown in FIG. 1. Optional steps 3013 and 3014 may also be skipped. Step 3015 may be performed as soon as step 3012 completes. For example, a computer implemented method performed on the mobile device could determine if a pre-requirement (e.g. at least three 3D features of the first plurality of 3D features have determined second coordinates) is satisfied for determining a similarity transformation.

Throughout this document it is described that image information associated with an image is provided or received. It is known to the skilled person that this may include providing or receiving any processed or non-processed information (version) of an image, part of an image and/or features of an image which allows for feature recognition and/or pose estimation. The invention does not require providing or receiving any raw image data. Processing thereby includes any one of compression (e.g. JPEG, PNG, ZIP), encryption (e.g. RSA encryption, Schnorr signature, El-Gamal encryption, PGP), conversion to another color space or grayscale, cropping or scaling the image or conversion into a sparse representation based on feature descriptors, extraction, and their combinations. All these image processing methods can optionally be performed and are covered by the terminology of image information of or associated with an image.

The invention claimed is:

1. A method of determining a similarity transformation between first coordinates and second coordinates of 3D features, comprising:
obtaining a first plurality of 3D features having first coordinates associated with a first geometrical model of a first real object;
obtaining image information associated with a plurality of images captured by a camera;
determining camera poses of the camera from which each of the plurality of images are captured;
for each of the first plurality of 3D features captured by the plurality of images:
determining a second coordinate according to the determined camera poses; and
determining a similarity transformation between the first coordinates and the second coordinates of the first plurality of 3D features, wherein the similarity transformation includes at least one of translation, rotation, and scale, in 3D space.

2. The method according to claim 1, further comprising:
transforming the first coordinates of the first plurality of 3D features according to the similarity transformation.

3. The method according to claim 1, wherein the second coordinate of at least one 3D feature of the first plurality of 3D features are determined based on triangulation according to image positions of the respective 3D feature in the at least two images of the plurality of images.

4. The method according to claim 1, further comprising:
providing a second plurality of 3D features having third coordinates in an additional coordinate system, wherein the additional coordinate system is associated with a second real object or with a second geometrical model of the second real object, and wherein the second plurality of 3D features describes physical 3D features of the second real object; and
for each respective 3D feature of the first plurality of 3D features, at least one 3D feature of the second plurality of 3D features is captured in each of the plurality of images.

5. The method according to claim 4, wherein the camera poses are determined in a second coordinate system according to image positions of the at least part of the second plurality of 3D features in the plurality of images and corresponding third coordinates.

6. The method according to claim 4, wherein the second coordinate system is associated with at least one camera at a position in which one image of the plurality of images is captured, and
wherein the camera poses of the camera are determined according to camera poses of the camera determined in the additional coordinate system.

7. The method according to claim 1, further comprising:
obtaining information from a tracking system; and
for each respective 3D feature of the first plurality of 3D features, determining the camera poses of the camera in a second coordinate system according to the tracking system,
wherein the second coordinate system is associated with the tracking system or is associated with the at least one camera at a position when one of the plurality of images is captured.

8. The method according to claim 1, wherein the plurality of images is a second plurality of images, the method further comprising:
providing image information associated with a first plurality of images of at least part of the first real object captured by a first camera, and
determining the first coordinates of the first plurality of 3D features in a first coordinate system according to the first plurality of images.

9. The method according to claim 1, further comprising:
detecting a first user input; and
in response to detecting the first user input is associated with a 3D reconstruction operation, performing the 3D reconstruction operation associated with the detected first user input.

10. A computer readable medium comprising computer readable code executable by one or more processors to:
obtain a first plurality of 3D features having first coordinates associated with a first geometrical model of a first real object;
obtain image information associated with a plurality of images captured by a camera;
determine camera poses of the camera from which each of the plurality of images are captured;
for each of the first plurality of 3D features captured by the plurality of images,
determine a second coordinate according to the determined camera poses; and
determine a similarity transformation between the first coordinates and the second coordinates of the first plurality of 3D features, wherein the similarity transformation includes at least one of translation, rotation, and scale, in 3D space.

11. The computer readable medium of claim 10, further comprising computer readable code executable by the one or more processors to transform the first coordinates of the first plurality of 3D features according to the similarity transformation.

12. The computer readable medium of claim 10, wherein the second coordinate of at least one of the first plurality of 3D features are determined based on triangulation according to image positions of the respective 3D feature in the at least two images of the plurality of images.

13. The computer readable medium of claim 10, further comprising computer readable code executable by the one or more processors to:
provide a second plurality of 3D features having third coordinates in an additional coordinate system, wherein the additional coordinate system is associated with a second real object or with a second geometrical model of the second real object, and wherein the second plurality of 3D features describes physical 3D features of the second real object; and
for each respective 3D feature of the first plurality of 3D features, at least one 3D feature of the second plurality of 3D features is captured in each of the plurality of images.

14. The computer readable medium of claim 13, wherein the camera poses are determined in a second coordinate system according to image positions of the at least part of the second plurality of 3D features in the plurality of images and corresponding third coordinates.

15. The computer readable medium of claim 13, wherein the second coordinate system is associated with at least one camera at a position in which one image of the plurality of images is captured, and
wherein the camera poses of the at least one camera in the second coordinate system are determined according to camera poses of the at least one camera determined in the third coordinate system.

16. The computer readable medium of claim 10, further comprising computer readable code executable by the one or more processors to:
obtain information from a tracking system; and
for each respective 3D feature of the first plurality of 3D features, determining the camera poses of the camera in a second coordinate system according to the tracking system,
wherein the second coordinate system is associated with the tracking system or associated with the camera at a position when one image of the plurality of images is captured.

17. A system comprising:
one or more processors; and
a memory coupled to the one or more processors and comprising software code executable by the one or more processors to:
obtain a first plurality of 3D features having first coordinates associated with a first geometrical model of a first real object;
obtain image information associated with a plurality of images captured by a camera;
determine camera poses of the camera from which each of the plurality of images are captured;
for each of the first plurality of 3D features captured by the plurality of images:
determine a second coordinate according to the determined camera poses; and
determine a similarity transformation between the first coordinates and the second coordinates of the first plurality of 3D features, wherein the similarity transformation includes at least one of translation, rotation, and scale, in 3D space.

18. The system of claim 17, further comprising software code executable by the one or more processors to transform the first coordinates of the first plurality of 3D features according to the similarity transformation.

19. The system of claim 17, wherein the second coordinate of at least one 3D feature of the first plurality of 3D features are determined based on triangulation according to image positions of the respective 3D feature in the at least two images of the plurality of images.

20. The system of claim 17, further comprising software code executable by the one or more processors to:
provide a second plurality of 3D features having third coordinates in an additional coordinate system, wherein the additional coordinate system is associated with a second real object or with a second geometrical model of the second real object, and wherein the second plurality of 3D features describes physical 3D features of the second real object; and
for each respective 3D feature of the first plurality of 3D features, at least one 3D feature of the second plurality of 3D features is captured in each of the plurality of images.

* * * * *